United States Patent Office 2,939,797
Patented June 7, 1960

2,939,797

GLASS COMPOSITIONS

Guy E. Rindone, State College, Pa., assignor to Prismo Safety Corporation, Huntingdon, Pa., a corporation of Pennsylvania No Drawing. Filed Apr. 20, 1959, Ser. No. 807,331

12 Claims. (Cl. 106—47)

The present invention relates to glass compositions having a high index of refraction and, more particularly, to glass compositions suitable for making small glass beads for use as retroreflective elements.

Painted highway markings and signs have been made strikingly visible to night time motorists by including small transparent glass beads in the paint layer. These tiny particles, in conjunction with the reflective pigment of the paint, act to reflect the incident light from the headlights back toward its source and thus make the painted area visible to the motorist.

To be effective for such use, the beads must have certain properties. They must have a fairly high refractive index, be transparent, resistant to weathering, and have great chemical stability. In the past, beads having a refractive index in the neighborhood of 1.55 or even lower, have been used. More recently, beads having a refractive index of at least 1.60 and in the range of 1.65–1.70 have been proposed.

In my prior Patents 2,838,408 and 2,861,001 glass compositions having an index of refraction of over 1.90 have been proposed. A characteristic of these glasses has been their faint yellow color.

It is an object of the present invention to provide novel compositions of glass which have high indices of refraction and yet are water white in color.

It is a further object of the present invention to provide novel compositions of glass which have indices of refraction of 1.90 or over and still have good chemical stability.

It is a still further object of the present invention to provide novel glass compositions for making glass beads suitable for the reflectorizing of highway paints and signs.

A still further object of the present invention is to provide novel compositions of glass suitable for reflectorizing highway paints and signs that may be used indefinitely without surface deterioration, even in industrial areas where acid fumes are present in the atmosphere.

These and other objects of the invention are accomplished by the following invention, wherein a glass having an index of refraction of 1.90 or over, which is chemically stable to weathering, is produced which eliminates the need for silicon dioxide and lead oxide and contains titanium dioxide, barium oxide, boron oxide and zinc oxide.

In the past, most high index glasses contain appreciable quantities of silicon dioxide and lead oxide. A characteristic of these glasses has been their faint yellow color, and in addition the addition of lead oxide has been hazardous to personnel during the melting operation. Further, the inclusion of large amounts of lead oxide may cause the resulting glass beads to darken by the action of fumes near industrial areas.

It has now been discovered that the disadvantages of the previously suggested glass compositions can be eliminated by the complete replacement of the silicon dioxide by boron oxide, the elimination of lead oxide, and the use of substantial quantities of titanium dioxide and barium oxide.

Heretofore when large amounts of titanium dioxide have been introduced into the glass compositions, the glasses tend to devitrify under the rapid cooling needed in glass bead manufacture. In accordance with the present invention, it is possible to include up to 57 mol percent titanium dioxide in the composition without this result. In the present compositions, indices of over 2.00 have been obtained without lead oxide or other heavy metal oxide because of the larger amounts of titanium dioxide which can now be introduced without causing the glasses to devitrify under rapid cooling.

The following example illustrates the preferred composition ranges:

EXAMPLE 1

| | Mol percent |
|---|---|
| $TiO_2$ | 35.6–57.0 |
| $BaO$ | 22.8–40.0 |
| $B_2O_3$ | 5.5–26.9 |
| $ZnO$ | 0– 20 |

Preferably, the sums of the mol percentages of the various ingredients should be in the following ranges:

| | Mol percent |
|---|---|
| $BaO+TiO_2$ | 67.3–93.0 |
| $BaO+B_2O_3$ | 35.3–54.9 |
| $TiO_2+B_2O_3$ | 45.2–72.0 |
| $B_2O_3+ZnO$ | 7.0–32.7 |
| $BaO+TiO_2+ZnO$ | 73.1–94.5 |

Examples of specific compositions are shown in the following table, which likewise shows the batch composition for each glass:

Table I

| No. | Composition, Mol Percent | | | | Batch Composition, By Weight | | | | Index of Refraction |
|---|---|---|---|---|---|---|---|---|---|
| | $B_2O_3$ | $TiO_2$ | $BaO$ | $ZnO$ | $H_3BO_3$ | $TiO_2$ | $Ba(NO_3)_2$ | $ZnO$ | |
| 1 | 21.9 | 45.1 | 33.0 | ------ | 26.5 | 35.3 | 85.0 | ------ | 1.925 |
| 2 | 10.0 | 57.0 | 33.0 | ------ | 12.1 | 44.3 | 83.6 | ------ | 1.995 |
| 3 | 7.0 | 54.6 | 38.4 | ------ | 8.2 | 40.5 | 94.0 | ------ | 1.965 |
| 4 | 10.3 | 56.6 | 31.0 | 2.1 | 12.1 | 42.8 | 75.9 | 1.6 | 1.995 |
| 5 | 9.6 | 35.6 | 35.6 | 19.2 | 11.6 | 26.7 | 91.0 | 13.6 | 1.900 |
| 6 | 10.2 | 49.2 | 28.3 | 12.3 | 12.6 | 39.6 | 74.6 | 10.0 | 1.995 |
| 7 | 5.5 | 51.7 | 29.8 | 18.0 | 6.6 | 40.8 | 77.0 | 10.4 | 2.025 |
| 8 | 26.9 | 45.1 | 25.0 | 3.0 | 34.8 | 37.7 | 87.6 | 2.5 | 1.915 |
| 9 | 26.7 | 44.5 | 22.8 | 6.0 | 35.2 | 37.9 | 63.5 | 5.1 | 1.910 |
| 10 | 10.0 | 48.0 | 40.0 | 2.0 | 11.6 | 35.4 | 96.7 | 1.5 | 1.950 |
| 11 | 10.8 | 51.7 | 24.5 | 13.0 | 13.7 | 42.6 | 66.4 | 10.9 | 2.025 |
| 12 | 12.3 | 52.9 | 28.6 | 6.2 | 15.3 | 42.2 | 75.0 | 5.0 | 1.985 |
| 13 | 18.9 | 48.1 | 33.0 | ------ | 22.8 | 37.8 | 84.5 | ------ | 1.940 |
| 14 | 10.0 | 37.0 | 33.0 | 20.0 | 12.1 | 27.8 | 83.4 | 16.7 | 1.915 |
| 15 | 10.2 | 43.2 | 32.3 | 14.3 | 12.3 | 33.6 | 82.5 | 11.3 | 1.945 |
| 16 | 10.2 | 41.2 | 30.3 | 18.3 | 12.5 | 32.4 | 78.6 | 14.7 | 1.945 |
| 17 | 10.2 | 45.2 | 36.3 | 8.3 | 11.9 | 34.2 | 90.2 | 6.4 | 1.940 |

It has been found that the addition of zinc oxide not only increases the refractive index of these glasses, but also acts as a purifier of color. Compositions which may otherwise become faintly colored by traces of impurities introduced with the raw materials or by corrosion of the melting container become colorless when zinc oxide is present under similar circumstances.

On slow cooling these glass compositions devitrify completely. However, rapid quenching prevents divitrification and produces transparent particles. Quenching the molten glass in water, as is the usual practice, is sufficient to produce transparent glass particles. The beads can be made by fusing particles of glass cullet which are blown or dropped through a high temperature flame or a radiant heating zone to soften them sufficiently to form transparent spheres by the action of surface tension while moving through air, followed by rapid cooling to harden the spheres without devitrification taking place. The cullet can be made by quenching a stream of molten glass in water. The beads can also be made directly from a batch of molten glass.

Each of the batches listed in Table I melted readily at temperatures of 1200° to 1350° C. in contact with corrosion-resistant refractories such as zircon, alumina, or metallic platinum. A neutral or oxidizing furnace atmosphere is required in order to prevent the reduction of $TiO_2$ which causes a purple coloration. Oxidizing agents such as $As_2O_3$ or $Sb_2O_3$ may be added for this purpose. When quenched rapidly, as in water, these batches formed clear water white glasses suitable for use in manufacturing spheres.

The small transparent glass beads or spheres may be produced from these compositions by suspending small particles of the glass in air at moderately high temperatures for a brief time and then quickly cooling. Whereas much larger masses having these compositions would either crack or devitrify, small spheres can be successfully prepared by such methods in the form of clear, transparent, substantially water white, weather-resistant and traffic-resistant beads.

The exceptionally high index of refraction of these glass compositions give beads having an unusually high reflectivity or brilliance. In addition, these glasses do not exhibit the light yellow color of previous high index glasses but are colorless. They withstand weathering indefinitely and do not contain lead oxide which is hazardous to personnel during the melting operation and which may cause the glass to darken by the action of fumes near industrial areas.

It will be obvious to those skilled in the art that various changes may be made without departing from the spirit of the invention and therefore the invention is not limited to what is described in the specification, but only as indicated in the appended claims.

What is claimed is:

1. Transparent, weather-resistant small glass beads having a refractive index of at least 1.90 and a composition consisting essentially of the following ingredients in the mol percents indicated:

| | |
|---|---|
| $TiO_2$ | 35.6–57.0 |
| BaO | 22.8–40.0 |
| $B_2O_3$ | 5.5–26.9 |
| ZnO | 0–20 |

2. Transparent, weather-resistant small glass beads having a refractive index of at least 1.90 and a composition consisting essentially of the following ingredients in the mol percents indicated:

| | |
|---|---|
| $TiO_2$ | 35.6–57.0 |
| BaO | 22.8–40.0 |
| $B_2O_3$ | 5.5–26.9 |
| ZnO | 0–20 |
| $BaO+TiO_2$ | 67.3–93.0 |
| $BaO+B_2O_3$ | 35.3–54.9 |
| $TiO_2+B_2O_3$ | 45.2–72.0 |
| $B_2O_3+ZnO$ | 7.0–32.7 |
| $BaO+TiO_2+ZnO$ | 73.1–94.5 |

3. Transparent, weather-resistant small glass beads having a refractive index of at least 1.90 and a composition consisting essentially of the following ingredients in the mol percents indicated:

| | |
|---|---|
| $TiO_2$ | 35.6–57.0 |
| BaO | 22.8–40.0 |
| $B_2O_3$ | 5.5–26.9 |
| ZnO | 0–20 |
| $BaO+TiO_2$ | 67.3–93.0 |

4. Transparent, weather-resistant small glass beads having a refractive index of at least 1.90 and a composition consisting essentially of the following ingredients in the mol percents indicated:

| | |
|---|---|
| $TiO_2$ | 35.6–57.0 |
| BaO | 22.8–40.0 |
| $B_2O_3$ | 5.5–26.9 |
| ZnO | 0–20 |
| $BaO+B_2O_3$ | 35.3–54.9 |
| $BaO+TiO_2$ | 67.3–93.0 |

5. Transparent, weather-resistant small glass beads having a refractive index of at least 1.90 and a composition consisting essentially of the following ingredients in the mol percents indicated:

| | |
|---|---|
| $TiO_2$ | 35.6–57.0 |
| BaO | 22.8–40.0 |
| $B_2O_3$ | 5.5–26.9 |
| ZnO | 0–20 |
| $BaO+TiO_2$ | 67.3–93.0 |
| $TiO_2+B_2O_3$ | 45.2–72.0 |
| $BaO+B_2O_3$ | 35.3–54.9 |

6. Transparent, weather-resistant small glass beads having a refractive index of at least 1.90 and a composition consisting essentially of the following ingredients in the mol percents indicated:

| | |
|---|---|
| $TiO_2$ | 48 |
| BaO | 40 |
| $B_2O_3$ | 10 |
| ZnO | 2 |

7. Transparent, weather-resistant small glass beads having a refractive index of at least 1.90 and a composition consisting essentially of the following ingredients in the mol percents indicated:

| | |
|---|---|
| $TiO_2$ | 37.0 |
| BaO | 33 |
| $B_2O_3$ | 10 |
| ZnO | 20 |

8. Transparent, weather-resistant small glass beads having a refractive index of at least 1.90 and a composition consisting essentially of the following ingredient in the mol percents indicated:

| | |
|---|---|
| $TiO_2$ | 51.7 |
| BaO | 29.8 |
| $B_2O_3$ | 5.5 |
| ZnO | 13.0 |

9. Transparent, weather-resistant small glass beads having a refractive index of at least 1.90 and a composition consisting essentially of the following ingredients in the mol percents indicated:

| | |
|---|---|
| $TiO_2$ | 51.7 |
| BaO | 24.5 |
| $B_2O_3$ | 10.8 |
| ZnO | 13.0 |

10. Transparent, weather-resistant small glass beads having a refractive index of at least 1.90 and a composition consisting essentially of the following ingredients in the mol percents indicated:

| | |
|---|---|
| $TiO_2$ | 56.6 |
| BaO | 31.0 |
| $B_2O_3$ | 10.3 |
| ZnO | 2.1 |

11. Transparent, weather-resistant small glass beads having a refractive index of at least 1.90 and a composition consisting essentially of the following ingredients in the mol percents indicated:

| | |
|---|---|
| $TiO_2$ | 57.0 |
| BaO | 33.0 |
| $B_2O_3$ | 10.0 |

12. Transparent, weather-resistant small glass beads having a refractive index of at least 1.90 and a composition consisting essentially of the following ingredients in the mol percents indicated:

| | |
|---|---|
| $TiO_2$ | 45.1 |
| BaO | 25.0 |
| $B_2O_3$ | 26.9 |
| ZnO | 3.0 |

References Cited in the file of this patent

UNITED STATES PATENTS

| 2,702,749 | Hafner et al. | Feb. 22, 1955 |
| 2,790,723 | Stradley et al. | Apr. 30, 1957 |